Oct. 8, 1957
J. J. KOVAC
2,808,903
SPRING LOADED GRIP
Filed Jan. 13, 1956
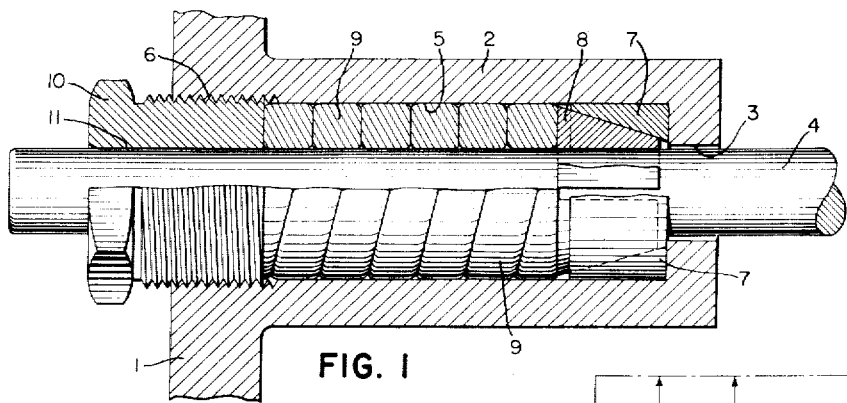
FIG. 1
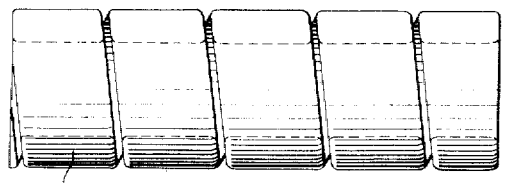
FIG. 2
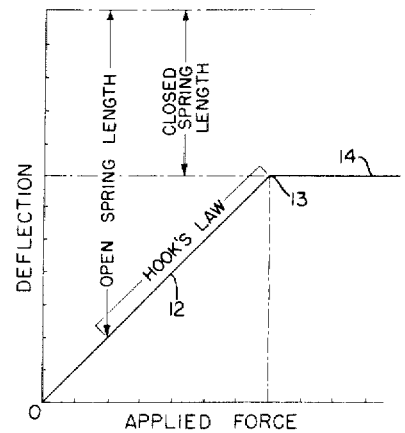
FIG. 5
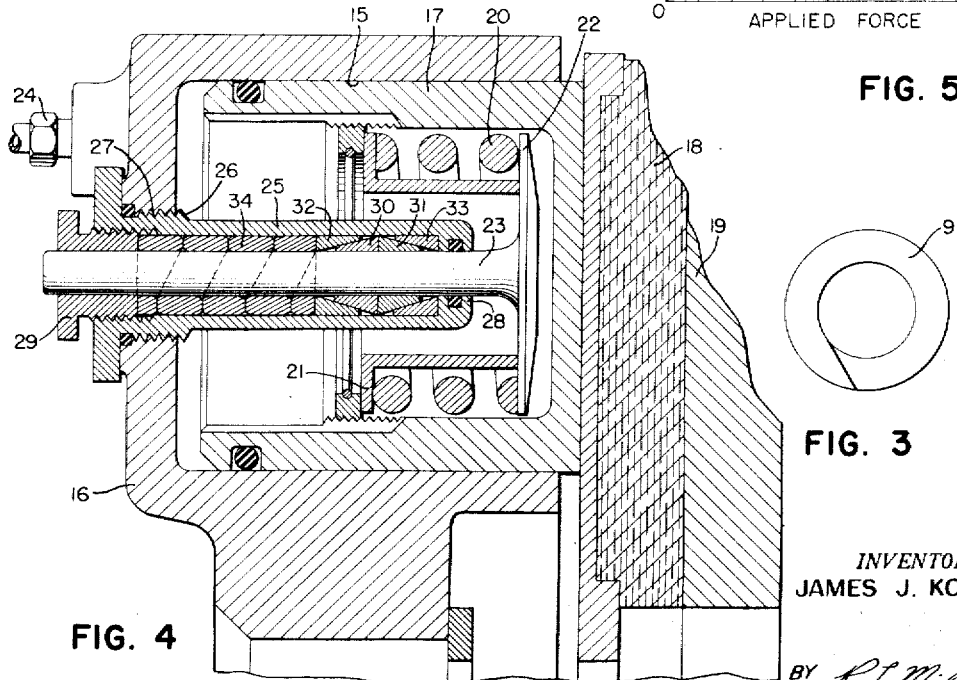
FIG. 3
FIG. 4
INVENTOR.
JAMES J. KOVAC
BY *R. L. Miller*
ATTORNEY United States Patent Office 2,808,903
Patented Oct. 8, 1957

2,808,903
SPRING LOADED GRIP

James J. Kovac, Akron, Ohio, assignor to The Goodyear Tire & Rubber Company, Akron, Ohio, a corporation of Ohio Application January 13, 1956, Serial No. 558,861

3 Claims. (Cl. 188—67)

This invention relates to a spring loaded grip and is particularly useful where a rod is to be frictionally held against a displacing force of a definite amount. The invention is especially useful in the manufacture of hydraulic brakes where it may be employed to hold adjustment of a brake operating cylinder mechanism and to provide automatic adjustment thereof with increased brake clearance.

In the construction of hydraulic brakes for aircraft it has been proposed to provide brake operating cylinders having a compression coil spring for returning the piston with the return spring seated on a member carried by a rod gripped normally against axial movement by torque loaded gripping collars but through which slippage of the rod to a new position of adjustment may be accomplished by force applied axially to the rod by reason of increased piston movement required by brake wear and excessively loading the return spring of the piston.

Such devices as have been constructed heretofore for this purpose have required extremely sensitive adjusting tools such as torque wrenches for their adjustment.

It is the object of this invention to provide a spring loaded grip which may be properly adjusted without the necessity of torque wrench equipment.

Other objects are to provide a spring loaded grip in which the proper adjustment may be felt by the operator, one in which bottoming of the coils of a spring upon each other determines proper tension adjustment, and to provide simplicity of construction and ease of adjustment.

These and other objects will appear from the following description and the accompanying drawings.

Of the drawings:

Fig. 1 is a view partly broken away and partly in cross-section of an embodiment of the invention, the section being taken on an axial plane of the rod.

Fig. 2 is a detail side view of the spring.

Fig. 3 is an end view thereof.

Fig. 4 is a sectional view of a brake shoe and its operating cylinder taken on an axial plane of the cylinder and showing the spring loaded grip of the invention applied thereto.

Fig. 5 is a force diagram.

Referring to the drawings, and first to Figs. 1 to 3 thereof, the numeral 1 designates a support provided with an elongate boss 2 having a cylindrical cavity or bore 3 extending axially thereof through which extends a rod 4, of uniform cross-section. The boss 2, is formed with a counter-bore 5 terminating in an internally threaded portion 6 at its open end and providing an apertured wall at the opposite end of the cavity to receive a rod 4. For providing a determinate grip on the rod relative to the support 1, a bushing 7 having a conical bore is placed in the counter-bore 5 about the rod 4. A second bushing 8 having an outer conical surface having the same slope as the bore of the bushing 7 and a bore equal to or slightly larger than the diameter of rod 4 is located about the rod within the bore of bushing 7. The bushings 7 and 8 are telescopically nested. Bushing 8 may be split axially and its largest diameter is greater than the greatest bore of bushing 7 so that it may be wedged between the bushing 7 and the rod 4 while its larger end projects beyond the end of bushing 7. A compression coil spring 9 has an outer diameter smaller than the counter-bore and has a bore slightly larger than the diameter of the rod 4. The spring is preferably made of wire of rectangular cross-section and is mounted about rod 4 within the counter-bore with one end of the spring abutting the larger end of bushing 8 and the opposite end of the spring 9 abutting an externally threaded tubular nut 10 which engages the threads 6 of the counter-bore 5 while its bore 11 clears the rod 4. It will be apparent that a force applied axially to the spring 9 by rotation of the nut 10 in a direction to enter it in the counter-bore 5 will be in turn applied axially to the gripping bushing 8 tending to force it into the bushing 7 to grip the shaft. If such axially applied force is less than the force necessary to completely close the coils of the spring, the spring will follow Hook's law in that deflection or shortening of the spring length will be in proportion to the force applied to the ends of the spring. This is illustrated in Fig. 5 where applied force is plotted against spring deflection. When the axially applied force is greater than that necessary to completely close the coils of the spring, the spring acts as a solid thrust member. In other words as the nut 10 is turned to compress the spring 9 the spring yields as indicated by the slope 12 of the lines in Fig. 5 and when the spring is completely closed the sharp turn 13 in the line is reached.

The effective force applied to the surface of the rod 4 to grip it will depend upon the angle of the cone 8 and the force applied thereto axially of the bushing as well as to the friction area of the bushing in contact to the rod.

When the spring is completely closed no further deflection can take place as indicated by the horizontal line 14 in Fig. 5. The nut 10 may be adjusted with an ordinary short handled wrench and when the turn 13 is reached may be readily felt by the operator. The spring 9 is so dimensioned as to provide the exact gripping force to rod 4 when the spring coils are completely closed and this condition of the spring is readily determined by resistance to turning of nut 10.

While the spring loaded grip may find many applications it is especially useful in providing for automatic adjustment of hydraulically operated brake cylinders. Such a brake cylinder is shown in Fig. 4 where the numeral 15 designates a brake cylinder formed in a stationary brake support 16. A piston 17 is fitted in the cylinder and supports a brake shoe 18 adapted to frictionally engage a rotatable disc brake member 19 to provide a decelerating force to a rotating body supporting the disc. The brake shoe is held clear of the disc 19 in the non-braking position by a return spring 20 mounted between a shoulder 21 of the piston and a shoulder 22 of an adjusting rod 23, and may be moved into engagement with the brake disc 19 by hydraulic pressure applied to cylinder 15 through a connection 24.

It is desirable in such a brake cylinder to provide for automatic adjustment of the position of shoulder 22 to compensate for wear of the brake. It has been suggested that such an adjustment might be accomplished by a gripping member applied to the rod 23, the grip being such that when wear of the brake provided too great a brake clearance, action of the piston 17 in applying the brake would so increase the tension of return spring 20 as to cause it to move rod 23 relative to its gripping means to a new position of adjustment. This has required precise adjustment of the gripping means which heretofore could only be accomplished by use of a torque-wrench for adjustment. By use of the grip of the present invention, use of a torque wrench is eliminated and adjustment is simplified. To provide for gripping the rod 23, the rod is surrounded by a tubular support 25 secured axially of the cylinder by threads 26 engaging a threaded opening 27 in the center of the head of the cylinder 15. The support 25 has an inwardly turned flange or apertured wall 28 at its inner end and is internally threaded at its opposite end to receive a threaded tubular nut 29, the central bore of the flange 28 and the bore of the nut 29 being slightly larger in diameter than the rod 23 so that the rod may slide freely therethrough. A pair of similar conical gripping bushings 30, 31 are arranged back to back about the rod 23 each bushing being surrounded by a bushing, 32, 33. Bushings 32, 33 are slidably seated in the base of support 25. The outer taper of the bushings 30, 31 is preferably about 35 degrees included angle and the larger ends of these bushings are larger than the larger end of the tapered bores of bushings 32, 33 and normally project therebeyond. In other words the gripping means comprises conical bushings telescopically nested to provide wedging action. The bushings 30, 31 may be split axially. The gripping means shown in this embodiment of the invention is similar to that of Fig. 1 except that a pair of similar gripping means are employed, it being understood that any number of such gripping means may be mounted on one rod. A compression coil spring 34 similar to the spring 9 of Fig. 1 is mounted about rod 23 within support 25 between the gripping bushings and the nut 29 for applying tension to the gripping means. As in the case of the spring 9, the spring 34 is closely wound of strong, preferably rectangular steel wire with the coils of the spring closely spaced apart and is of such material and dimensions as to have its coils completely closed when a force is applied thereto just equal to the pressure to be applied axially to the gripping bushings to provide the desired grip of the rod 23. With such a construction the nut 29 may be screwed into the support until a sudden change in resistance to advance is felt by the operator which indicates that the spring is completely closed and is applying the correct pressure.

While certain representative embodiments and details have been shown for the purpose of illustrating the invention, it will be apparent to those skilled in the art that various changes and modifications may be made therein without departing from the spirit or scope of the invention.

I claim:

1. A spring loaded grip for frictionally engaging a rod with a determinate resistance against axial movement, said grip comprising a support defining a cylindrical cavity therethrough, said support providing an apertured wall at one end of said cavity to slidably receive a rod extending axially of the cavity, said cavity having an internal thread at its end opposite side apertured wall, a tubular nut engaging said threads and encompassing said rod, telescopically nested conical bushings about said rod within said support for applying a gripping reaction against said rod under a force applied axially of said bushings, and a coil spring about said rod between said conical bushings and said tubular nut for applying the axial force to the gripping bushings, said spring being axially compressible under loads less than a determinate load necessary to grip said rod with the desired force and being noncompressible at and beyond such determinate load.

2. A spring loaded grip for frictionally engaging a rod with a determinate resistance against axial movement, said grip comprising a support defining a cylindrical cavity therethrough, said support providing an apertured wall at one end of said cavity to slidably receive a rod extending axially of the cavity, said cavity having an internal thread at its end opposite said apertured wall, a tubular nut engaging said threads and encompassing said rod, telescopically nested conical bushings about said rod within said support for applying a gripping reaction against said rod under a force applied axially of said bushings, and a coil spring about said rod between said conical bushings and said tubular nut for applying the axial force to the gripping bushings, said spring having its coils spaced apart when under an axial compression load less than a determinate load necessary to grip said rod with the desired force and having its coils completely closed at and beyond such determinate load.

3. A spring loaded grip for frictionally engaging a rod with a determinate resistance against axial movement, said grip comprising a support defining a pocket with an apertured wall at one end thereof to slidably receive a rod extending axially of the pocket, said pocket being internally threaded to an open end opposite the apertured wall, a tubular nut engaging said threads and encompassing said rod, annularly arranged cooperating gripping means within said pocket and about said rod, said gripping means being contractable about said rod under axially applied pressure, and a coil spring about said rod between said gripping means and said tubular nut for applying the axial force to said gripping means, said spring being axially compressible under loads less than a determinate load necessary to grip said rod with the desired force and being noncompressible at and beyond such determinate load.

References Cited in the file of this patent

UNITED STATES PATENTS

| 2,486,663 | Lovejoy | Nov. 1, 1949 |
| 2,551,252 | Du Bois | May 1, 1951 |
| 2,720,286 | Bricker | Oct. 11, 1955 |

UNITED STATES PATENT OFFICE

CERTIFICATE OF CORRECTION

Patent No. 2,808,903October 8, 1957

James J. Kovac

It is hereby certified that error appears in the printed specification of the above numbered patent requiring correction and that the said Letters Patent should read as corrected below.

Column 4, line 2, for "side" read -- said --.

Signed and sealed this 7th day of January 1958.

(SEAL)
Attest:

KARL H. AXLINE
Attesting Officer

ROBERT C. WATSON
Commissioner of Patents